(No Model.)
T. S. CRAIG.
STEAM COOKER.
No. 420,335. Patented Jan. 28, 1890.
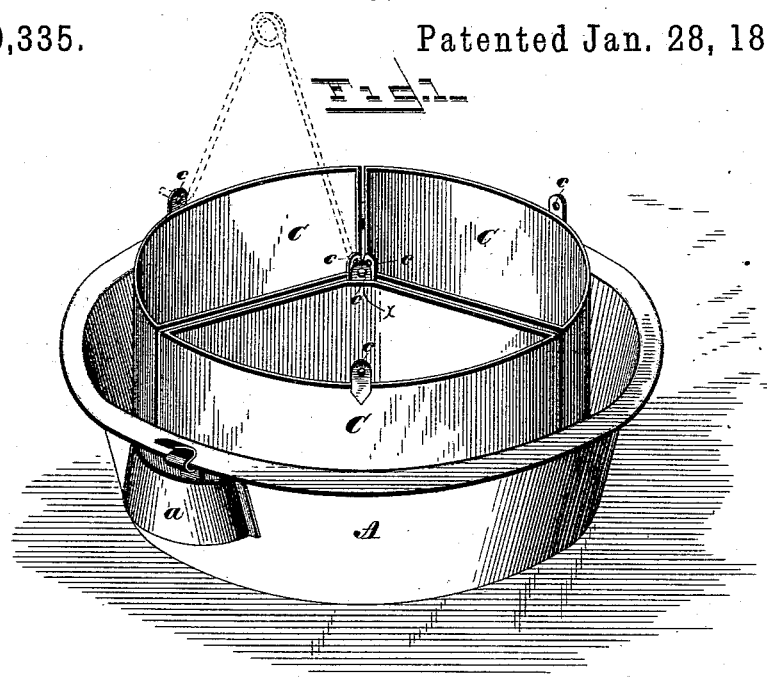
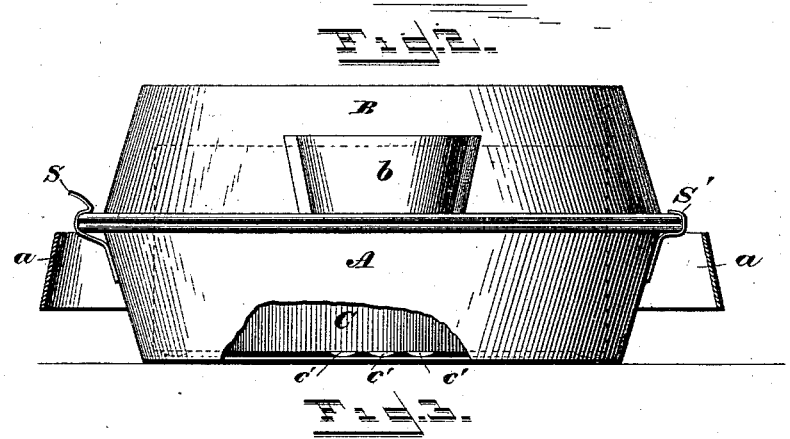
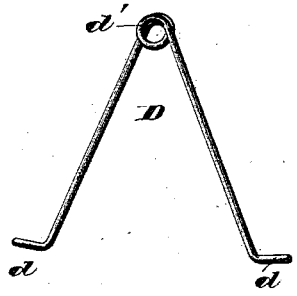
WITNESSES
G. S. Elliott
E. W. Johnson
Thomas S. Craig.
INVENTOR
by
Attorney

UNITED STATES PATENT OFFICE.

THOMAS S. CRAIG, OF HUBBELL, NEBRASKA, ASSIGNOR OF ONE-HALF TO WILLIAM B. LOGSDON, OF SAME PLACE.

STEAM-COOKER.

SPECIFICATION forming part of Letters Patent No. 420,335, dated January 28, 1890.

Application filed October 25, 1888. Serial No. 289,130. (No model.)

*To all whom it may concern:*

Be it known that I, THOMAS S. CRAIG, a citizen of the United States of America, residing at Hubbell, in the county of Thayer and State of Nebraska, have invented certain new and useful Improvements in Steam-Cookers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to cooking utensils; and it consists in the improved construction and arrangement of parts hereinafter described and set forth, whereby an article is provided wherein a series of different food-containing vessels are inclosed in a steaming-case, the sections of the latter being adapted for service as pans or dishes, while the interior receptacles are designed to be removed by a simple device and handled by a separate bail forming part of the combination outfit.

In the accompanying drawings, forming part of this specification, Figure 1 is a perspective view of my improved combination cooking utensil, the upper section of the pan being removed. Fig. 2 is a side view of said cooking utensil, part of the lower inclosing section being broken away to indicate how said interior receptacles are supported; and Fig. 3 is a detail view showing the bail by which either of the interior receptacles are moved into or out of position.

The inclosing-case of the utensil consists of a lower section A and upper section B, the latter being inverted, and both sections being in the form of pans or dishes, either of which may be used for cooking or dish-washing operations generally. The said sections A B are of equal depth and size in order that they may be conveniently and readily procured, and so that they will be of a standard size when used for other operations. The lower section is provided adjacent to its upper edge with clips S S' extending above the rim and located diametrically opposite to each other.

A series of three or more triangular receptacles C are adapted to be removably located in the inclosing-case and are of such size and depth that they conjointly leave an outer marginal space between them and the inclosing-case, and are also slightly separated from each other, so that circulating-spaces are formed between their parallel sides. Each receptacle C is provided at its inner angle and centrally at the upper edge of the curved side with projecting ears $c$ $c$, perforated on a line with each other. The bottom of each receptacle C is provided with a series of hemispherical lugs $c'$, which support the receptacle above the bottom of the inclosing-case, enabling water to circulate thereunder and preventing the contents of said receptacles from burning.

Each of the pans forming the inclosing-case is provided with handles $a$ $a$, arranged diametrically opposite to each other, the handles of the upper inverted section B being correspondingly inverted. The clip S' is adapted to hold the beads of the two sections A B together, as also the clip S; but the latter is provided with an upper extended portion to facilitate its disengagement to release the sections A B.

By reference to the dotted lines in Fig. 2 it will be noted that the inner receptacles $c$ are each of such height that very nearly half is located in the upper section B, so that the space above the water-line in the lower section A is such that half or more of each receptacle is not immersed, leaving the major portion of its walls to be acted upon by the steam.

A detachable spring-bail D, consisting of two outwardly-diverging portions having their connecting portion bent to form a spring-loop $d'$, while the terminals of said diverging portions are bent outward and upward to form engaging ends $d$. This bail D, by reason of its spring-loop $d'$, is adapted to be contracted so that its ends $d$ can be sprung into engagement with the ears $e$ of any one of the receptacles C, to enable the latter to be removed from or placed into position. The relative length of the bail D is such that while engaging with the ears of any one of the receptacles it can be laid in the position represented by dotted lines in Fig. 1, so as to be always handy and convenient within the inclosing-case to effect the movement of any of the receptacles and need not necessarily be mislaid during the cooking operation.

The sides of each receptacle C do not converge to a sharp angle, but are merged into a transverse plain face $x$, which not only, in connection with the like faces of the other receptacles, forms a vertical central circulating-passage, but also makes provision for the attachment at the upper end thereof of the inner ears $e$.

From the foregoing it will be seen that the device embodying my improvement comprises a number of parts all coacting to present a highly useful and simple food-steamer, while the corresponding size and construction of the sections A B and of the receptacles C adapt them individually for many other purposes in the line of cooking service.

I am aware that previous to my invention it has been proposed to place a series of independent and corresponding steaming-receptacles in a single vessel of considerably greater depth, the said vessel having a cover and provided internally with a perforated disk for supporting the receptacles above the bottom. I am also aware that it has been proposed to make a vegetable-steamer of two specially-arranged circular sections, each differing in size and construction from the other, but adapted to be connected by spring-clips somewhat similar to the clips employed by me. I am further aware that it has heretofore been proposed to make a roasting or bake pan of two corresponding rectangular sections secured together. I am also aware that spring-bails have been devised to removably engage various characters of vessels. My invention, however, will be readily distinguished from such prior constructions, in that I embody in a single device a food-steamer, the casing of which is composed of two circular pans of corresponding size and construction, and both of which are adapted to be additionally used as pans generally, together with internal receptacles C, which are provided with means to support themselves out of contact with the bottom of the casing, and are of such depth that they extend into the space formed by the upper pan, and a single spring-bail, common in its adaptation to all of the receptacles, the relative size of each receptacle and said bail being such that it can, while in engagement with one of said receptacles, be laid horizontally upon the same and permit the upper section to be adjusted in position.

Another important feature connected with my improvement consists in the fact that the inclosing-case consists of two well-known pans of commerce, which may be easily procured, and to one of which is attached the spring-clips, which in no sense affect its usefulness for other purposes.

I claim—

1. The combination, in a food-steamer, of an inclosing-case consisting of two sections A B, formed by two simple circular pans or dishes of corresponding size and construction, one of which is provided with spring-clips, together with a series of internal separated receptacles C C, each of a greater depth than either of the sections A B, and provided independently with a series of bottom lugs and upper ears $c\ c$, and a detachable spring-bail, adapted for common engagement with the receptacles and capable of horizontal position within the limits of the inclosing-case, substantially as set forth.

2. The combination, with the inclosing-case consisting of two simple circular pans or dishes of corresponding size and construction, of spring-clips for locking the same, internal separated receptacles C C, provided with inner vertical plain faces and having bottom lugs, ears $c\ c$, one of which is secured at the end portion of said plain face, and a detachable spring-bail adapted for common engagement with the receptacles and capable of horizontal position within the limits of the inclosing-case, substantially as set forth.

In testimony whereof I affix my signature in presence of two witnesses.

THOMAS S. CRAIG.

Witnesses:
S. F. VINTON,
C. F. SININGER.